(12) United States Patent
Crutchley

(10) Patent No.: US 6,447,227 B1
(45) Date of Patent: Sep. 10, 2002

(54) THREADED FASTENER

(75) Inventor: Derek Crutchley, Warrington (GB)

(73) Assignee: Textron Fastening Systems Limited (GB)

( * ) Notice: Subject to any disclaimer, the term of this patent is extended or adjusted under 35 U.S.C. 154(b) by 0 days.

(21) Appl. No.: 09/762,157

(22) PCT Filed: Aug. 23, 1999

(86) PCT No.: PCT/GB99/02776

§ 371 (c)(1),
(2), (4) Date: Mar. 19, 2001

(87) PCT Pub. No.: WO00/11355

PCT Pub. Date: Mar. 2, 2000

(30) Foreign Application Priority Data

Aug. 21, 1998 (GB) .............................. 9818255

(51) Int. Cl.[7] ........................... F16B 13/06; F16B 37/12
(52) U.S. Cl. ..................... 411/69; 411/178; 411/271; 411/311
(58) Field of Search .............................. 411/69, 70, 178, 411/271, 310, 311, 325

(56) References Cited

U.S. PATENT DOCUMENTS

| 3,220,454 A | * | 11/1965 | Neuschotz | 411/178 |
| 3,230,994 A | * | 1/1966 | Rosan | 411/178 |
| 3,319,690 A | * | 5/1967 | Rosan et al. | 411/178 |
| 4,273,175 A | * | 6/1981 | Capuano | 411/310 X |
| 4,642,010 A | * | 2/1987 | Bradley et al. | 411/69 |
| 5,011,352 A | * | 4/1991 | Hatter | 411/271 |
| 5,156,507 A | | 10/1992 | Underbrink | |

FOREIGN PATENT DOCUMENTS

GB 2140891 5/1984

OTHER PUBLICATIONS

A Search Report which issued in connection with a corresponding British patent application.

* cited by examiner

Primary Examiner—Neill Wilson
(74) Attorney, Agent, or Firm—Trexler, Bushnell, Giangiorgi, Blackstone & Marr, Ltd.

(57) ABSTRACT

A threaded fastener which includes a shank, a radially enlarged head at one end, an external thread on at least a part of the shank, and a bore which extends through the head and into the threaded part of the shank. At least the threaded part of the shank is radially expandable into the threaded engagement with the wall of a suitable unthreaded bore in a workpiece in which the threaded part has been inserted. The fastener thereafter is removable by unscrewing it from the workpiece bore. The expandable part of the shank is provided with a plurality of radially extending lugs or other protrusions provided on the threaded part of the shank thereby to resist unscrewing of the fastener from the workpiece bore.

13 Claims, 4 Drawing Sheets

THREADED FASTENER

BACKGROUND

The invention relates to a threaded fastener of the type comprising,.

a shank, a radially enlarged head at one end of the shank, an external screw thread on at least a part of the shank, and a bore extending through the head and into the threaded part of the shank;

at least the threaded part of the shank being radially expandable into threaded engagement with the wall of a suitable unthreaded bore in a workpiece in which the threaded part has been inserted, the fastener thereafter being removable by unscrewing it from the workpiece bore.

Such a fastener is hereinafter referred to as "a fastener of the type defined". An example of such a fastener is commercially available and well known under the Registered Trade Mark RIVSCREW, and is described in GB 2 140 891 A, to which the reader is referred for a fuller description.

It will be appreciated that when using such fasteners it is the frictional engagement between the fastener and the workpiece which resists and prevents the fastener from becoming unscrewed from the workpiece. There has now arisen a requirement to use such fasteners in workpieces of relatively soft or resilient materials such as certain types of plastics. In such circumstances the frictional engagement may be substantially reduced, due to the resilience or softness of the workpiece material and/or to the reduced co-efficient of friction resulting when one of the surfaces is of plastics material, so that there could be a potential danger of the fastener becoming unintentionally loosened.

OBJECTS AND SUMMARY

Accordingly the present invention provides, in one of its aspects, a fastener he type defined in which the expandable part of the shank is provided with a plurality of radially extending lugs or other protrusions thereby to resist unscrewing the fastener from the workpiece.

BRIEF DESCRIPTION OF THE DRAWINGS

Further preferred features of the invention are set out in attached claims 2 to 14.

A specific embodiment of the invention will be described by way of example and with reference to the accompanying drawings, in which.

DETAILED DESCRIPTION

Figure 1:
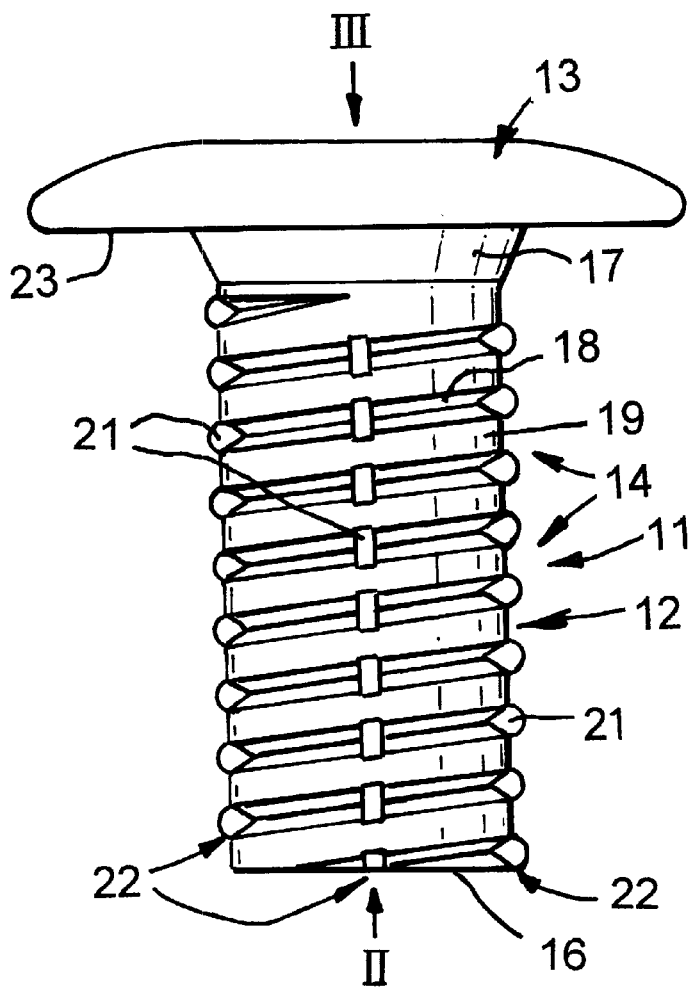
FIG. 1 is a side elevation of a fastener.

Referring first to FIGS. 1 to 5, the fastener 11 of this example is made of aluminium alloy having typically 2.5% magnesium (e.g. type 5052) and is about 8 mm overall length. It comprises a shank 12 of generally cylindrical symmetry, a radially enlarged head 13 at one end of the shank, an external screw thread 14 extending along the major part of the length of the shank, and a bore 15 extending completely through the head and shank. The thread 14 extends from the tail end 16 (i.e. the end remote from the head 13) along the majority of length of the shank 12, but stops short of a tapering radially enlarged part 17 of the shank adjacent the head 13. The thread 14 consists of a single-start groove 18 of vee-section (shown in FIG. 8) and a flat-topped crest 19 which is about twice as wide as the groove 18.

The threaded part of the fastener shank 12 is provided with a large number of radially extending lugs 21. These lugs are located in the trough of the groove 18 of the thread and protrude radially outwardly above the crest. Each lug extends completely across the width of the groove trough and has a curved top edge, above the thread crest 19, and has two substantially flat opposite faces, facing in opposite directions, each face being at right angles to the direction substantially tangential to the shank. In the accompanying drawings the radial extent of protrusion of the lugs is somewhat exaggerated for clarity of illustration. The lugs are arranged in four rows 22, each row extending along the shank in a direction substantially parallel to the axis of the shank, the rows being spaced apart by 900 around the circumference of the shank so that there are two sets of two rows, the two rows in each set being diametrically opposite each other.

Figure 2:
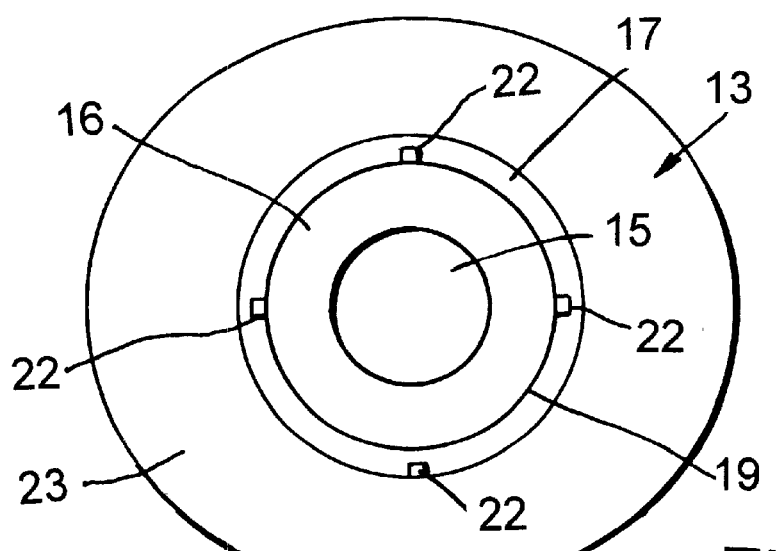
FIG. 2 is an underplan view of the fastener, in the direction of the arrow II of FIG. 1.
Figure 3:
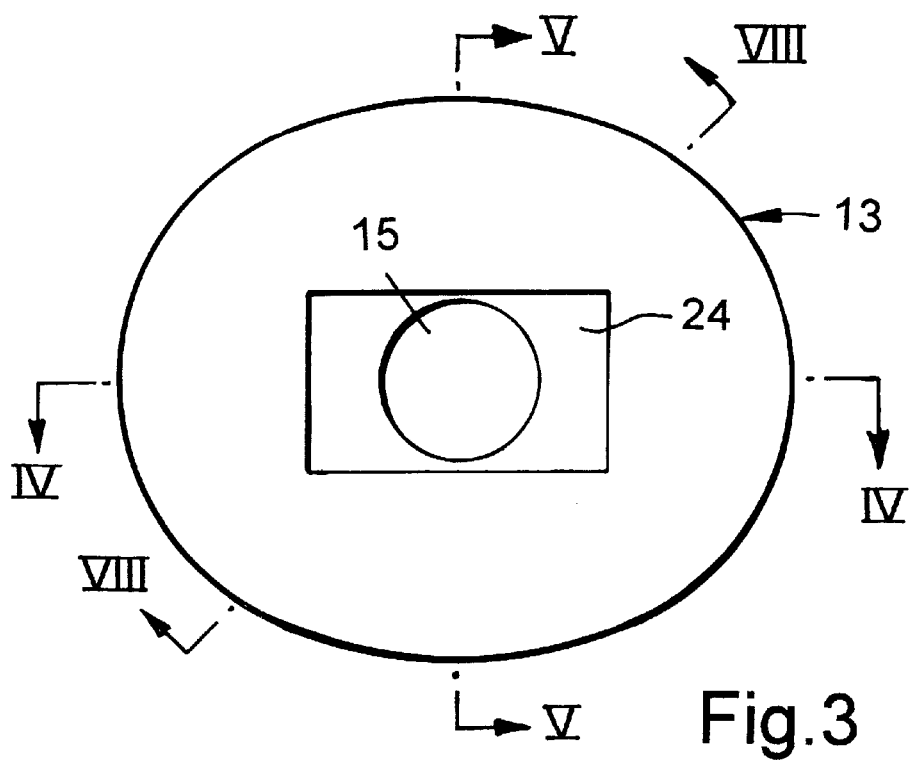
FIG. 3 is a plan view of the fastener in the direction of the arrow III of FIG. 1.

The head 13 is of substantially oval or elliptical shape, as illustrated in FIGS. 2 and 3, the longer diameter (on the line IV—IV of FIG. 3) being about 1.2 times the shorter diameter (on the line V—V of FIG. 30. The head is of conventional "pan head" profile, and has a flat underface 23.

The head 13 is provided with a wrenching recess for co-operation with a suitable wrenching tool or driver to rotate an installed fastener to unscrew it. In this example fastener, the recess is in the form of a generally rectangular-section slot 24. The slot is co-axial with the bore 15, and has its longer and shorter axes respectively coinciding with the longer and shorter axes of the head 13, as illustrated in FIG. 3.

Figure 4:
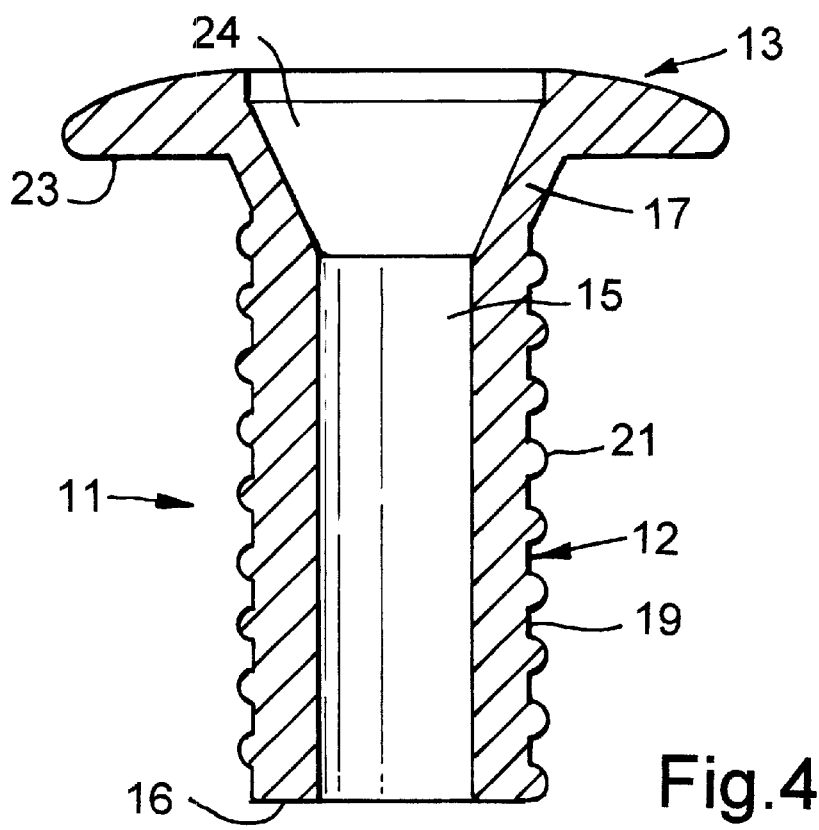
FIG. 4 is a longitudinal axial section on the line IV—IV of FIG. 3.
Figure 5:
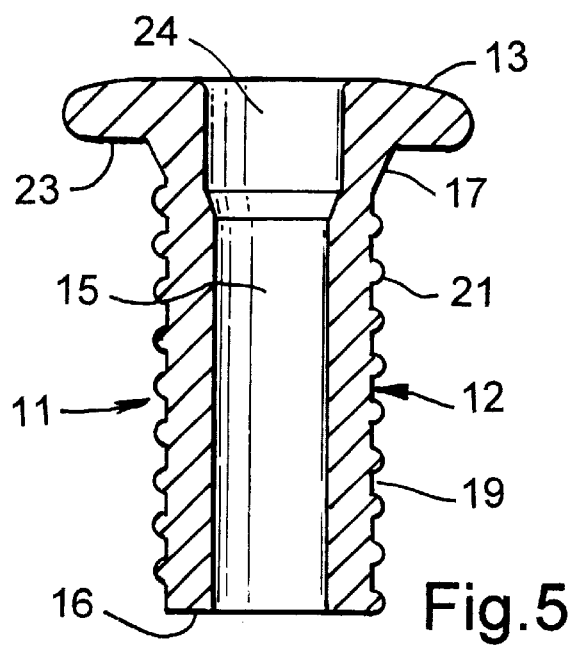
FIG. 5 is a longitudinal axial section on the line V—V of FIG. 3.

From FIGS. 3, 4 and 5 it will be seen that the longer transverse length of the slot 24 reduces as it approaches the end of the bore 15 (see FIG. 4), whereas the shorter transverse width of the slot remains constant over substantially its whole depth (see FIG. 5). As seen in FIG. 4, the tapering shape of the slot substantially corresponds to the tapering shape of the shank enlargement 17.

Figure 6:
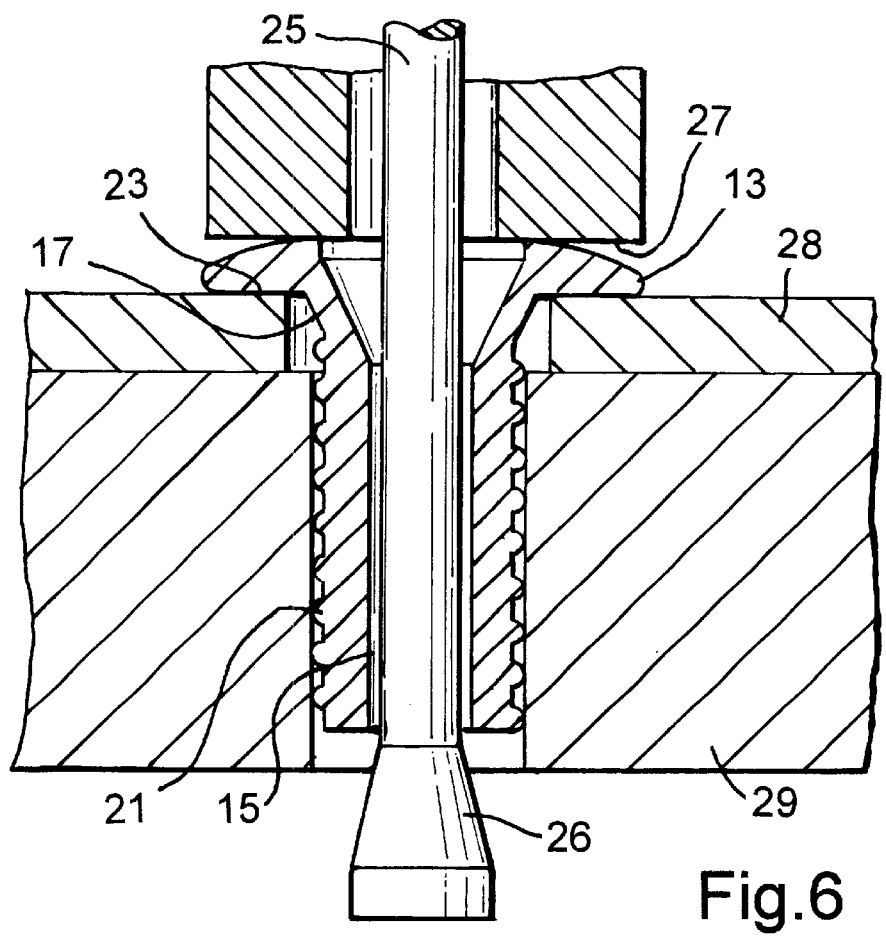
FIG. 6 corresponds to FIG. 4 and shows the fastener inserted in workpieces and about to be installed.

FIG. 6 shows the fastener inserted in a workpiece, ready for installation. As is standard practice, a number of fasteners are loaded on a mandrel 25 which has a tapering enlarged head 26, larger than the fastener shank bore 15, which is pulled through each fastener in turn in order to radially expand its shank. The mandrel 25 forms part of an installation tool (not shown) of well-known type, which includes an annular nosepiece 27 (provided by separable jaw-members to enable each fastener to be fed through it in turn). In this example, the fastener is used to secure a relatively thin workpiece member 28 to a thicker member 29 which is of plastics material, e.g. PTFE (polytetrafluoroethylene). The member 29 is provided with a bore 31 in which the fastener shank 12 including the projecting lugs 21 is a clearance fit. The thinner member 28 is formed with a circular hole 32 which in current workshop assembly practice will be rather larger in diameter than the bore 31 in order to assist in relative alignment of the hole and bore. The hole 32 is thus large enough to accommodate the widest part of the tapering fastener underhead enlargement 17.

As is usual with fasteners of the type defined, the shank 12 of the fastener on the mandrel 25 is inserted through the hole 32 and into the bore 31 until the underface 23 of the head 13 contacts the near face of the near workpiece 28. The installation tool is pushed so that the nosepiece 27 presses the fastener head underface 13 against the workpiece 28 and so pushes the workpiece 28 into contact with the workpiece 29, closing any gap between them. The tool is then actuated to withdraw the mandrel 25 progressively into the nosepiece 27. The mandrel head 26 is thus drawn through the bore 15 of the fastener, progressively radially expanding the shank from the tail end towards the head end, the reaction to the pulling force being taken through the nosepiece 27 against the fastener head 13. This radial expansion of the shank causes the lugs 21 to embed into the material of the wall of the workpiece bore 31. Since the lugs adjacent the tail end of the shank become embedded first, the tail end part of the shank is the first part to become anchored to the adjacent part of the bore. The progressive radial enlargement of the shank causes a slight axial contraction in its length, as is well known. Hence the resulting progressive slight shortening of the fastener shank pulls the fastener head 13 towards the workpiece 29.

Figure 7:
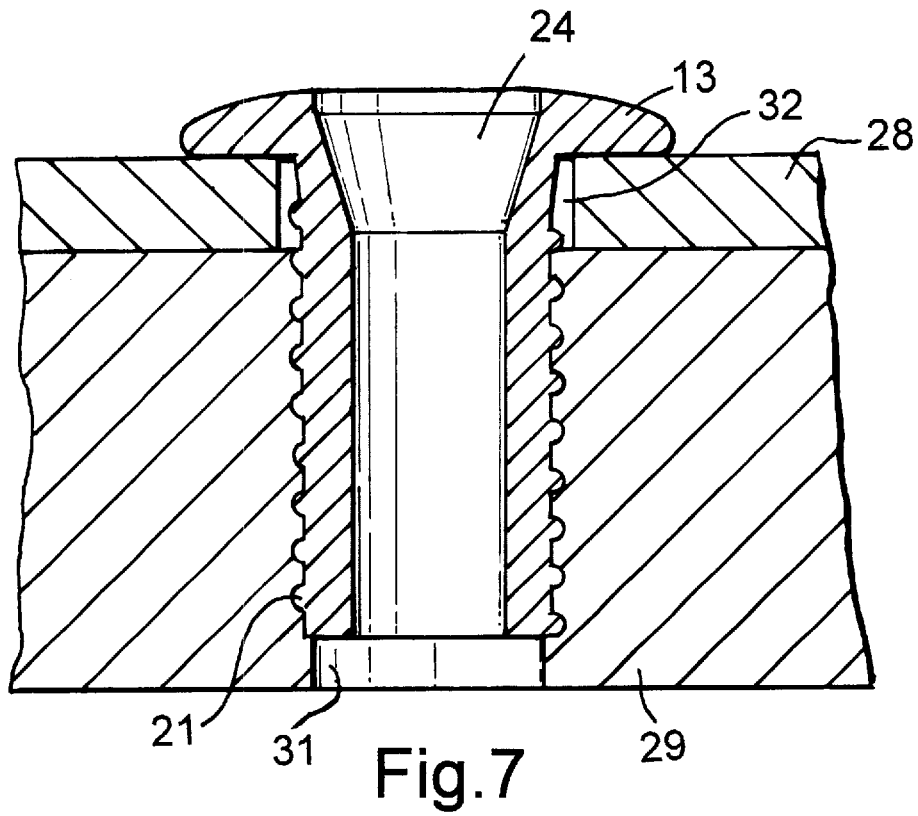
FIG. 7 corresponds to FIG. 6 and shows the fastener after installation.
Figure 8:
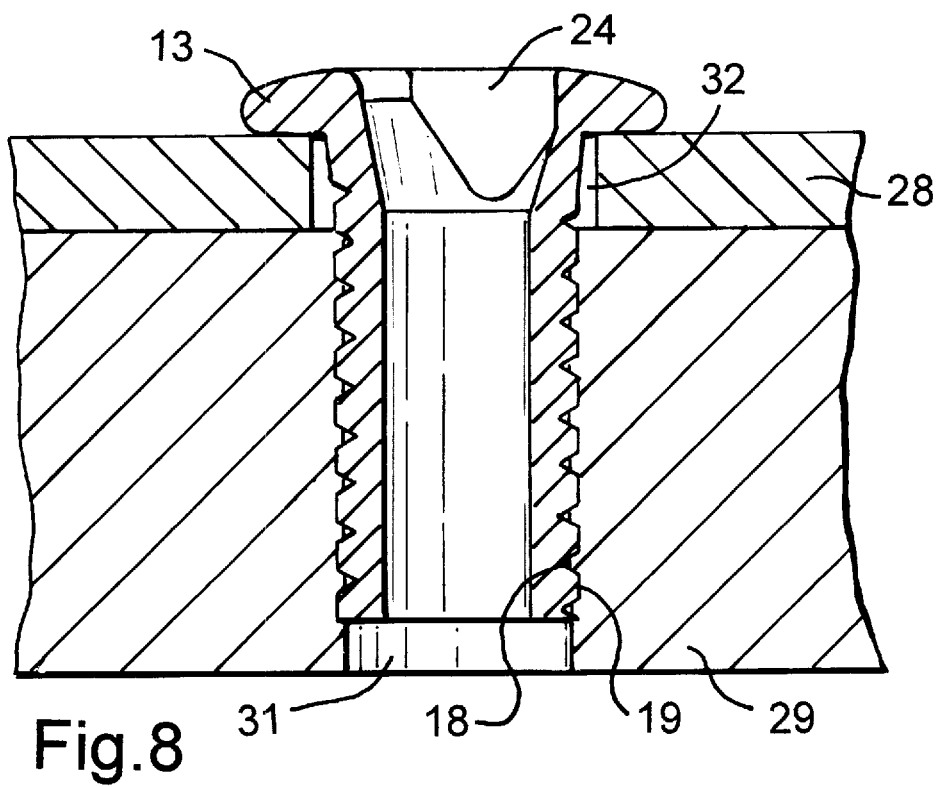
FIG. 8 is a longitudinal axial section through the installed fastener, taken on the line VIII—VIII of FIG. 3.

The mandrel head 26 eventually emerges from the head end of the fastener bore 15 and the tool is removed, leaving the fastener installed, as illustrated in FIGS. 7 and 8. As shown in FIG. 7, the radial enlargement of the shank has resulted in all of the lugs 21 which are inside the workpiece bore 31 becoming embedded in the material of the workpiece 29. FIG. 8 shows that the radial expansion has also resulted in the crest parts of the thread entering the wall of the workpiece bore, so that the radially outer part of the groove contains material from the workpiece bore wall.

It is found that the embedding of the lugs 21 in the workpiece bore wall provides substantially positive resistance to rotation of the installed fastener, i.e. a high "torque to turn" figure. For this reason, it has been found desirable to configure the wrenching recess 24 and its relationship to the head so that the recess walls, and the adjacent parts of the head and shank, can support the substantial forces generated when rotating the installed fastener by means of a suitable wrenching tool having a blade or spigot which is complementary in shape to the fastener head recess 24. The tapering shape of the recess and tool assist in keeping the tool in engagement with the recess when the tool is in use. The initial resistance to rotation is also assisted by the high compressive forces, and hence frictional forces, between the underhead face 23 and the outer face of the workpiece 28. If the outer workpiece 28 is sufficiently soft or resilient, the underhead face 23 may embed itself to some extent in the workpiece 28, when its non-circular shape adds still further to the resistance to turning.

It is also found that, after initial unscrewing rotation of the fastener has been achieved, the fastener continues to offer a high resistance to the remainder of the unscrewing operation (i.e. a high prevailing torque). It has been found from inspection of unscrewed fasteners that the projecting parts of the lugs 21 may have been deformed or bent so that they no longer project above the crest of the thread. However, they remain attached to the shank of the fastener, rather than becoming detached from it. This helps to prevent the generation of swarf or undesired metal particles at the site, which is an important practical requirement by users of such fasteners.

The lugs also increase the axial pull-out force.

The invention is not restricted to the details of the foregoing example.

For instance, the radially extending lugs or protrusions could take any other convenient form, and could be arranged on the fastener shank in any other convenient way. For example, there could be three, or six, or eight, rows of protrusions. If arranged in a row or rows, the row or rows could be aligned in some other way about the shank, e.g. helically. It would be possible for only part of the shank to be threaded, with some or all of the protrusions located on the plain or non-threaded expandable part of the shank.

An alternative configuration of wrenching surfaces, for unscrewing the fastener, could be provided. In particular, a hexagonal bore could be formed in the fastener during installation, by the use of a hexagonal-headed mandrel, as is described in GB 2 140 891 A.

The thread could be multi-start. The form of the thread could be other than as illustrated in the foregoing example. For instance, the pitch angle of the thread could be much greater, up to a single-turn helix extending the whole length of the shank.

What is claimed is:

1. A threaded fastener of the type comprising:

A a shank, a radially enlarged head at one end of the shank, an external screw thread on at least a part of the shank, and a bore extending through the head and into the threaded part of the shank, at least the threaded part of the shank being radially expandable into threaded engagement with the wall of a suitable unthreaded bore in a workpiece in which that threaded part has been inserted, the fastener thereafter being removable by unscrewing it from the workpiece bore;

the expandable part of the shank being provided with a plurality of radially Extending lugs or other protrusions provided on the threaded part of the shank thereby to resist unscrewing of the fastener from the workpiece bore.

2. A fastener as claimed in claim 1, in which each protrusion extends Outwardly from a position in the trough of the thread on the shank.

3. A fastener as claimed in claim 2, in which the part of a protrusion which is within the trough extends completely across the width of the trough.

4. A fastener as claimed in claim 1, in which each protrusion extends radially outwardly beyond the crest of the thread on the shank.

5. A threaded fastener of the type comprising:

a shank, a radially enlarged head at one end of the shank, an external screw thread on at least a part of the shank, and a bore extending through the head and into the threaded part of the shank, at least the threaded part of the shank being radially expandable into threaded engagement with the wall of a suitable unthreaded bore in a workpiece in which the threaded part has been inserted, the fastener thereafter being removable by unscrewing it from the workpiece bore;

the expandable part of the shank being provided with a plurality of radially extending lugs or other protrusions arranged in at least one row extending substantially parallel to the axis of the shank thereby to resist unscrewing of the fastener from the workpiece bore.

6. A fastener as claimed in claim 5, in which the protrusions are arranged in a plurality of such rows.

7. A threaded fastener of the type comprising:

a shank, a radially enlarged head at one end of the shank, an external screw thread on at least a part of the shank, and a bore extending through the head and into the threaded part of the shank, at least the threaded part of the shank being radially expandable into threaded engagement with the wall of a suitable unthreaded bore in a workpiece in which the threaded part has been inserted, the fastener thereafter being removable by unscrewing it from the workpiece bore;

the expandable part of the shank being provided with a plurality of radially extending lugs or other protrusions arranged substantially diametrically opposite each other about the shank axis thereby to resist unscrewing of the fastener from the workpiece bore.

8. A threaded fastener of the type comprising:

a shank, a radially enlarged head at one end of the shank, an external screw thread on at least a part of the shank, and a bore extending through the head and into the threaded part of the shank, at least the threaded part of the shank being radially expandable into threaded engagement with the wall of a suitable unthreaded bore in a workpiece in which the threaded part has been inserted, the fastener thereafter being removable by unscrewing it from the workpiece bore;

the expandable part of the shank being provided with a plurality of radially, extending lugs or other protrusions thereby to resist unscrewing of the fastener from the workpiece bore; and at least that part of the radially enlarged head which, in use of the fastener, abuts the part of the workpiece surrounding the bore, being of non-circular shape thereby to assist in resisting unscrewing rotation of the installed fastener with respect to the workpiece, if the fastener head is sufficiently embedded in the workpiece.

9. A fastener as claimed in claim 8, in which at least the said part of the fastener head is of a shape which is longer in one transverse dimension than in the transverse direction at tight angle thereto.

10. A fastener as claimed in claim 9, in which at least the said part of the fastener head is of a substantially oval or elliptical shape.

11. A fastener as claimed in claim 10, in which at least that part of the radially enlarged head which in use of the fastener, abuts the part of the workpiece surrounding the bore, is of non-circular shape, thereby to assist in resisting unscrewing rotation of the installed fastener with respect to the workpiece, if the fastener head is sufficiently embedded in the workpiece and in which at least the said part of the fastener head is of a shape which is longer in one transverse dimension than in the transverse direction at right angle thereto and in which the wrenching recess is elongated in the same direction as the longer transverse dimension of the said part of the head.

12. A threaded fastener of the type comprising:

a shank, a radially enlarged head at one end of the shank, an external screw thread on at least a part of the shank, and a bore extending through the head and into the threaded part of the shank, at least the threaded part of the shank being radially expandable into threaded engagement with the wall of a suitable unthreaded bore in a workpiece in which the threaded part has been inserted, the fastener thereafter being removable by unscrewing it from the workpiece bore;

the expandable part of the shank being provided with a plurality of radially extending lugs or other protrusions thereby to resist unscrewing of the fastener from the workpiece bore;

the fastener head being provided with a slot or other recess which is elongated across the head to provide wrenching surfaces for engagement with a suitable tool to unscrew an installed fastener.

13. A fastener as claimed in claim 12, in which the part of the fastener shank adjacent the head is radially enlarged, thereby to strengthen the part of the fastener adjacent the wrenching recess.

* * * * *

UNITED STATES PATENT AND TRADEMARK OFFICE
CERTIFICATE OF CORRECTION

PATENT NO. : 6,447,227 B1
DATED : September 10, 2002
INVENTOR(S) : Derek Crutchley It is certified that error appears in the above-identified patent and that said Letters Patent is hereby corrected as shown below:

Column 1,
Lines 46-47, "Further preferred features of the invention are set out in attached claims 2 to 14" should be deleted Column 4,
Line 30, "A a shank" should be -- a shank --
Line 37, "that" should be -- the --
Line 42, "Extending" should be -- extending --
Line 47, "Outwardly" should be -- outwardly --

Column 6,
Line 4, "tight" should be -- right --

Signed and Sealed this

Eleventh Day of February, 2003

JAMES E. ROGAN
*Director of the United States Patent and Trademark Office*